United States Patent [19]

Gebeke

[11] 4,405,097

[45] Sep. 20, 1983

[54] CASSETTE WITH A SLACK LIMITER TAB

[75] Inventor: Charles D. Gebeke, White Bear Lake, Minn.

[73] Assignee: Minnesota Mining and Manufacturing Company, St. Paul, Minn.

[21] Appl. No.: 284,222

[22] Filed: Jul. 17, 1981

[51] Int. Cl.³ .................. G03B 1/04; G11B 15/32; B65H 23/08
[52] U.S. Cl. ..................... 242/199; 226/195
[58] Field of Search ............ 242/76, 55.19 A, 192, 242/194, 197–200; 226/195–199; 360/93, 96.1, 132

[56] References Cited

U.S. PATENT DOCUMENTS

| 3,797,779 | 3/1974 | Esashi et al. ............... 242/199 |
| 4,290,567 | 9/1981 | Saito ........................... 242/198 |
| 4,304,374 | 12/1981 | Okamura et al. ............ 242/199 |
| 4,342,436 | 8/1982 | Oyama et al. ................ 242/199 |

*Primary Examiner*—Leonard D. Christian
*Attorney, Agent, or Firm*—Donald M. Sell; James A. Smith; William L. Huebsch

[57] ABSTRACT

An improved cassette having a flexible resilient slack limiter tab installed in a housing of the cassette without the use of adhesive. The slack limiter tab includes a tape contact end portion and a tapered projection. The housing of the cassette comprises rigid walls defining a receptacle which frictionally receives and compressively holds the tapered projection with the contact end portion biased into engagement with tape of the cassette to press the tape against a support surface of the housing to limit slack in the tape.

4 Claims, 4 Drawing Figures

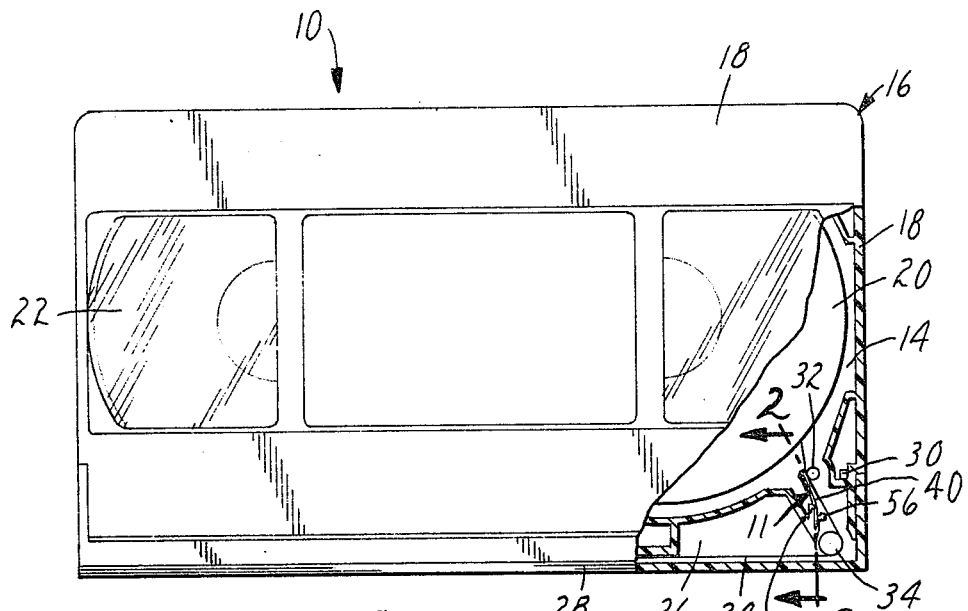
Fig. 1
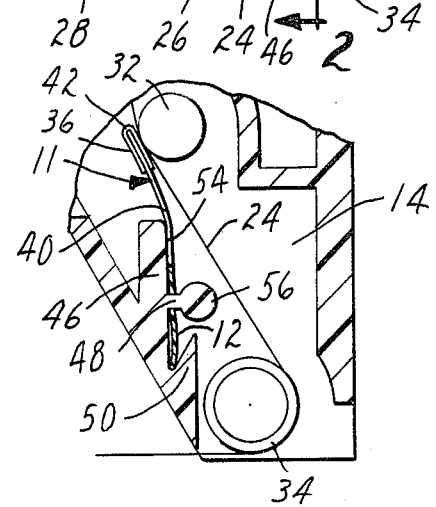
Fig. 3
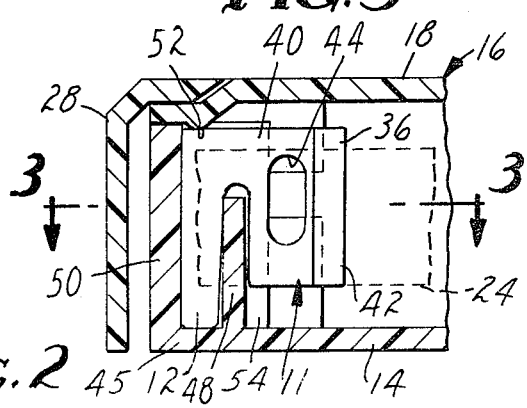
Fig. 4
Fig. 2

CASSETTE WITH A SLACK LIMITER TAB

BACKGROUND OF THE INVENTION

This invention relates to cassettes of the type including a length of tape having end portions wound around two reels rotatably mounted in a housing with a portion of the tape extending between the reels, and a tab for limiting slack in the tape between the reels.

Slack or looseness in the length of tape between the reels in such a cassette can arise when the cassette is being transported or is otherwise separated from a recording or reproducing device. While some cassettes have locks that restrict rotation of the reels when the cassette is not in a machine, it is still possible that one or both of the reels within the cassette may turn in the direction of unwinding to develop slack. Slack in the tape can also occur when the tape is engaged with a recording or reproducing device. Typically, the recording or reproducing device has spindles which engage the two reels. If driving and braking of the reels during the operation of the recording or reproducing apparatus is not synchronous, slack in the tape will develop. This slack may cause the tape to jam within the cassette or within the recording or reproducing device engaging the tape.

Cassettes having tabs to limit the slack in the tape are known in the art. For example, a flexible resilient slack limiter tab is described in U.S. Pat. No. 3,797,799. One end of the slack limiter tab biases tape in a cassette into engagement with a fixed support surface to cause a slight resistance to motion of the tape. The slack limiter tab is secured in position by cementing or adhesively fastening a portion of the tab to the housing of the cassette.

Adhesively fastening a slack limiting tab in a cassette requires more time than is desirable, particularly for highly automated assembly. Also adhesively fastened slack limiter tabs may become misaligned during installation, or the adhesive may fail after installation. Misalignment of the tab may cause excessive wear on the tape or improper performance of the tape. Adhesive failure, which can occur due to age, humidity, or stress on the tab due to misalignment during installation, may result in the tab being dislodged from its desired position, and even jamming of the dislodged tab in the cassette or in a machine in which the cassette is mounted.

SUMMARY OF THE INVENTION

The present invention provides an improved cassette having a slack limiter tab which can be rapidly installed and properly positioned in a housing of a cassette without the use of adhesive.

According to the present invention there is provided a flexible resilient slack limiter tab including a tape contact end portion adapted to contact tape in a cassette of the type described above, and an opposite end portion comprising a tapered projection. The housing of the cassette comprises mounting means for the tab comprising rigid walls defining a receptacle which frictionally receives and compressively holds the tapered projection, which mounting means position the tab with its contact end portion biased into transverse engagement with the tape to press the tape against a support surface fixed on the housing on the opposite side of the tape to limit slack in the tape.

Preferably, the tapered projection extends generally transverse to the path of the tape in the housing, with one molded side wall assembly of the housing including the rigid walls defining the receptacle, and an opposite molded side wall assembly engaging the edge of the tab opposite the receptacle to retain the projection in the receptacle.

BRIEF DESCRIPTION OF DRAWING

The present invention will be more thoroughly described with reference to the accompanying drawing wherein like numbers refer to like parts in the several views, and wherein:

FIG. 1 is a top view of a cassette including a slack limiter tab mounted according to the present invention and having parts broken away to show details;

FIG. 2 is a fragmentary sectional view taken approximately along line 2—2 of FIG. 1;

FIG. 3 is a fragmentary sectional view taken approximately along line 3—3 of FIG. 2 and rotated about 90 degrees counter-clockwise to correspond to FIG. 1; and FIG. 4 is a perspective view of the slack limiter tab in the cassette of FIG. 1.

DETAILED DESCRIPTION

Referring to the drawing, there is illustrated a cassette 10 including a slack limiter tab 11 according to the present invention mounted via novel mounting means comprising a tapered projection 12 on the tab 11 frictionally engaged in a receptacle defined by walls included in a molded side wall assembly 14 of the cassette 10.

The cassette 10 comprises a housing 16 including the molded side wall assembly 14 and an opposite molded side wall assembly 18, two reels 20 and 22 rotatably mounted between the side wall assemblies 16 and 18, and a length of tape 24 having opposite end portions wound around the reels 20 and 22 and a portion extending therebetween. The molded side wall assemblies 14 and 18 define a tape access area 26 (FIG. 1) along the outer surface of the housing 16, which access area 26, when the cassette 10 is not in use, is covered by a door 28 that can be pivoted open by a machine in which the cassette is mounted around pivot pins 30 rotatably mounted in the molded side wall assembly 18 to afford access to the tape 24 extending across the access area 26. Means including two cylindrical guide pins 32 and 34 guide the portion of the tape 24 between the reels 20 and 22 along a tortuous path across the access area 26 to afford engagement of the portion of the tape 24 extending between the reels 20 and 22 by a recording or reproducing device in which the cassette 10 is mounted. The slack limiter tab 11 is mounted in the housing 16 by the novel mounting means with a contact end portion 36 of the tab 11 biased into transverse engagement with the tape 24 and pressing the tape 24 against a support surface on the housing 16 provided by the guide pin 32 to restrict slack in the tape 24 between reels 20 and 22.

As is best seen in FIG. 4, the slack limiter tab 11 comprises a normally flat portion 40 of a flexible resilient polymeric material (e.g., 0.004 inch (0.010 cm.) thick polyester) having a sheet 42 of polymeric material adapted to engage the tape (e.g., 0.0035 inch (0.009 cm.) thick "Teflon") wrapped and adhered around one end portion to define the contact end portion 36, and an opposite end portion defining the projection 12. The flat portion 40 has a central opening 44 which is sized both to reduce the cross-sectional areas of the center of the tab 11 to provide the desired spring force applied by the tab 11 against the tape 24 along the tape path, and to afford access for a light sensor that insures that the tape 24 is along the path, as is well known in the art.

The mounting means includes walls of the molded side wall assembly 14 defining the receptacle which frictionally receive and compressively hold the projection 12 on the slack limiter tab 11, with the tapered projection 12 extending generally transverse to the path of the tape 24 in the housing 16. These walls are best seen in FIGS. 2 and 3, and comprises a bottom wall 45 that defines a bottom for the receptacle, together with a number of walls that project at right angles to the bottom wall 45 and transverse of the tape path in the cassette 10; including a brace wall 46 which defines one side of the receptacle, a transverse wall 48 which projects normal to the brace wall 46 and defines the end of the receptacle adjacent the contact end portion 36 of the tab 11, and an end wall 50 which intersects the brace wall 46 at an acute angle to define the end of the receptacle opposite the end portion 36 of the tab 11. The receptacle has a uniform width between the transverse and end walls 48 and 50 from top to bottom. The tapered projection 12 is narrower than the receptacle at its distal end, so that it is easily installed into the receptacle to assemble the tab 11 to the housing 16. The proximal end portion of the projection 12 is wider than the receptacle, however, so that upon assembly it is compressed and bowed between the transverse wall 48 and the end wall 50 (FIG. 3), whereupon the resiliency of the polymeric material biases the edges of the tapered projection against the transverse and end walls 48 and 50 to firmly hold the projection 12 in the receptacle. The molded side wall assembly 18 includes an opposing wall portion 52 positioned opposite the receptacle which contacts the edge of the tab 11 opposite the projection 12 to further assure retention of the projection 12 in the receptacle. This novel attaching means for the tab 11 allows generous tolerances in manufacturing the tab 11 and housing 16; and the tab 11 is readily adapted for reliable installation by automated manufacturing equipment.

The mounting means also includes a portion of the brace wall 46 that extends past the side of the transverse wall 48 opposite the receptacle, and provides a side support surface 54 for a portion of the tab 11 adjacent the projection 12. The side support surfaces 54 together with an enlarged cylindrical head 56 on the end of the transverse wall 48 opposite the brace wall 46 (which head 56 restricts movement of the portion of the tab 11 adjacent the projection away from the brace wall 46), and engagement of the projection 12 in the receptacle cantilever mount the contact end portion 36 of the tab 11 in a position biased against tape 24 extending around the pin 32.

I claim:

1. In a cassette comprising a housing having an access opening; two reels rotatably mounted within the housing; a length of tape having opposite end portions wound around said reels and a portion extending therebetween, means for guiding the tape portion extending between said reels across said access opening and along a relatively tortuous path between one of said reels and said access opening, a flexible resilient slack limiting tab having a contact end portion adapted to engage said tape and an opposite end portion, and mounting means for mounting said opposite end portion on said housing with said contact end portion transversely biased against said tape to press said tape against a support surface along said tortuous path, the improvement wherein:

said opposite end portion comprises a tapered projection having dimensions narrowing from a proximal end to a distal end and said housing comprises rigid walls defining a receptacle having a width intermediate said dimensions of said proximal and distal ends to frictionally receive and compressively hold said projection with said contact end portion in engagement with said tape, said receptacle and projection being included in said mounting means.

2. A cassette according to claim 1 wherein said projection extends generally transverse to the path of said tape in said housing.

3. A cassette according to claim 1 wherein said mounting means further includes a wall on said housing adjacent said receptacle having a support surface supporting the side of said tab adjacent said projection.

4. In a cassette comprising a housing having an access opening; two reels rotatably mounted within the housing; a length of tape having opposite end portions wound around said reels and a portion extending therebetween, means for guiding the tape portion extending between said reels across said access opening and along a relatively tortuous path between one of said reels and said access opening, a flexible resilient slack limiting tab having a contact end portion adapted to engage said tape and an opposite end portion, and mounting means for mounting said opposite end portion on said housing with said contact end portion transversely biased against said tape to press said tape against a support surface along said tortuous path, the improvement wherein:

said opposite end portion comprises a tapered projection which extends generally transverse to the path of said tape in said housing and said housing comprises opposed molded side wall assemblies, one of which includes rigid walls defining a receptacle frictionally receiving and holding said projection with said contact end portion in engagement with said tape, the opposing molded side wall including a wall portion positioned opposite said receptacle to engage the edge of said tab opposite said projection to retain said projection in said receptacle, said projection, receptacle and wall portion being included in said mounting means.

* * * * *